United States Patent [19]
Moore et al.

[11] 3,924,055
[45] Dec. 2, 1975

[54] CABLE SPACER FOR OVERHEAD POWER TRANSMISSION LINES

[75] Inventors: Edwin Barclay Moore; Bernard Oliver Crossley, both of Leicester, England; Roy Leonard Gladwell, Crofton, Md.

[73] Assignee: Dunlop Limited, England

[22] Filed: Oct. 21, 1974

[21] Appl. No.: 516,678

[30] Foreign Application Priority Data
Oct. 27, 1973 United Kingdom............... 50120/73

[52] U.S. Cl. ........ 174/40 R; 24/81 CC; 24/132 CS; 174/146
[51] Int. Cl.² ........................................ H02G 7/12
[58] Field of Search............. 174/40 R, 41, 42, 146, 174/160; 24/81 CC, 132 R, 132 CS, 134 Q, 248 R, 248 CR, 248 BJ, 262 R; 85/61; 191/41; 248/61; 403/119, 161, 163, 346, 400

[56] References Cited
UNITED STATES PATENTS

| | | | |
|---|---|---|---|
| 789,830 | 5/1905 | Zetterlund | 248/61 |
| 2,452,406 | 10/1948 | Volkery et al. | 24/81 CC |
| 2,825,751 | 3/1958 | Flower | 174/146 |
| 2,928,636 | 3/1960 | Flower | 174/146 X |
| 3,161,721 | 12/1964 | Torr | 174/146 X |

FOREIGN PATENTS OR APPLICATIONS
898,026  6/1962  United Kingdom................... 85/61

*Primary Examiner*—Laramie E. Askin
*Attorney, Agent, or Firm*—Stevens, Davis, Miller & Mosher

[57] ABSTRACT

A cable spacer for use between pairs of subconductors in overhead power transmission lines comprising a pair of similar lever arms, each lever arm having two semi-circular section grooves with a resilient lining, one groove being provided at either end of the lever arm, a pivotal connection between the lever arms arranged such that relative pivotal movement of the lever arms causes the grooves at the ends adjacent to the pivot to come together and form a first circular aperture for engaging a first subconductor and the grooves at the other end to form a second circular aperture for a second subconductor, and a fixing means for locking the arms in engagement with a pair of subconductors.

6 Claims, 5 Drawing Figures

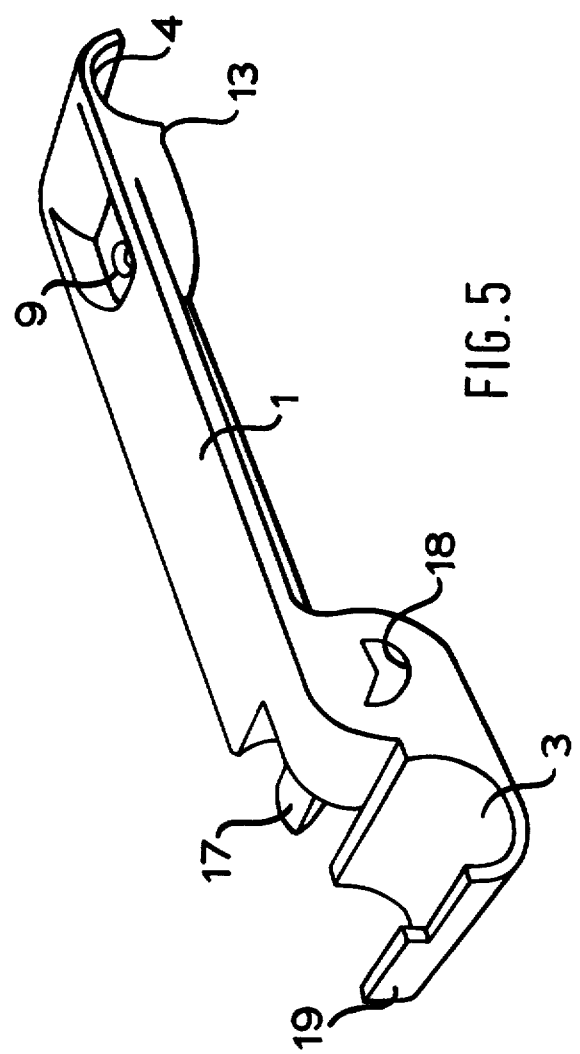

CABLE SPACER FOR OVERHEAD POWER TRANSMISSION LINES

This invention relates to a cable spacer for use between pairs of subconductors in overhead power transmission lines.

According to the invention, a spacer comprises a pair of similar lever arms, each lever arm having two semicircular section grooves with a resilient lining, one groove being provided at either end of the lever arm, a pivotal connection between the lever arms arranged such that relative pivotal movement of the lever arms causes the grooves at the ends adjacent to the pivot to come together and form a first circular aperture for engaging a first subconductor and the grooves at the other end to form a second circular aperture for a second subconductor, and a fixing means for locking the arms in engagement with a pair of subconductors.

Preferably, the pivotal connection is adjacent to the grooves at one end of each arm. Furthermore, the pivotal connection preferably has its axis parallel to the groove axes.

The fixing means is preferably at the ends of the lever arms remote from the pivotal connection and may comprise a bolt, preferably engaging a threaded aperture or, alternatively, with a nut, a spring clip or other such means. The fixing means preferably holds the lever arms in contact at a stop so that the compression upon the subconductors is substantially independent of the fixing means. The fixing means is preferably retained upon one of the levers so that it need not be handled separately. In the case of a bolt it is preferred to use a shearhead type bolt so that upon assembly a predetermined tightness is obtained without the need for a torque wrench.

The pivotal connection may be of various forms but is preferably provided by a pivot pin fixed in one lever. Alternatively, the pivot may be provided by each lever arm having a projection with a cross-section which is a minor segment of a circle and an aperture adjacent to the projection which is a major segment of the same circle which may further provide limits to the degree of opening allowed. Assembly of the lever arms is then by means of positioning each projection in the aperture in the other arm so that relative pivoting may be obtained. The assembly is then maintained by swaging the projections so as to prevent the projections and apertures becoming disengaged. The above described pivotal arrangements allow both lever arms to be substantially the same and they may then be formed in the same tool or mould.

The resilient lining for the groove is conveniently a layer of elastomeric material which is adhered to the groove surface. The groove surface preferably includes circumferential grooves to provide axial location of the resilient lining.

Other aspects of the invention will become apparent from the following description, by way of example only, of two embodiments of the invention in conjunction with the accompanying drawings in which:

FIGS. 4 and 5 show the separate lever arms of the spacer of FIG. 3.

Figure 1:
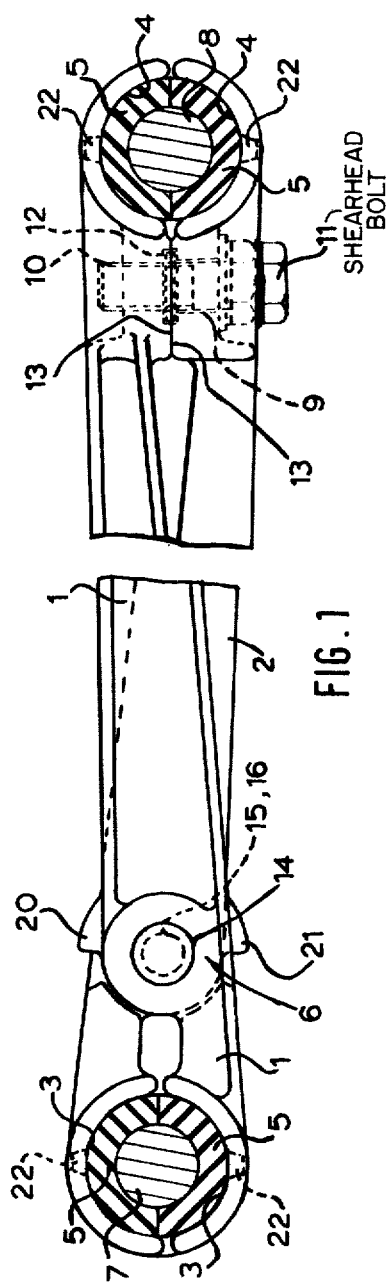
FIG. 1 shows in side elevation a spacer assembly according to the present invention attached to a pair of subconductors.
Figure 2:
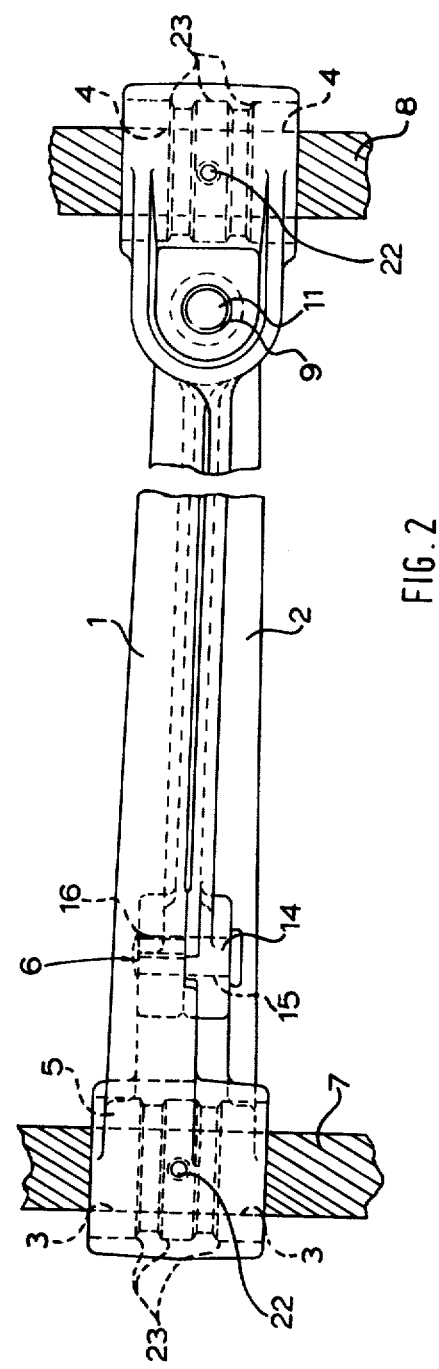
FIG. 2 is a plan view of the spacer shown in FIG. 1.

The spacer shown in FIG. 1 comprises two similar lever arms 1,2 each of which is an aluminium alloy casting. Grooves 3,4 are cast at the ends of each lever arm which are semi-circular in cross-section having a radius larger than that of the sub-conductor for which the spacer is intended. Each groove 3,4 is lined by a resilient neoprene liner 5 which is located by a projection 22 and held in place with an adhesive. Circumferential grooves 23 are provided in the grooves 3,4 to provide axial abutments between resilient liner 5 and the clamp grooves 3,4 to resist relative displacement of the liners in the axial direction when on a transmission line.

At the ends of the lever arms adjacent to the grooves 3 pivotal means 6 are provided so that the lever arms 1, 2 are pivotally connected in the manner of the arms of a pair of pliers. The connection is such that the grooves 3 and the grooves 4 are brought together as shown in FIG. 1 so as to allow engagement of two sub-conductors 7,8.

One lever arm 1 has a plain hole 9 at the end remote from the pivotal means 6 and the other lever arm 2 has a threaded hole 10 arranged to be aligned with the plain hole 9. A shearhead bolt 11 is retained in the plain hole 9 by a rubber retaining washer 12. The bolt 11 may be screwed into the hole 10 to lock the lever arms together upon assembly of the spacer onto the sub-conductors. Projections 13 are provided on each casting of each lever arm 1,2 so that upon manual contact of the surfaces 13, the bolt tension does not affect the loading upon the resilient liners 5.

The pivotal connection 6 is obtained by means of an aluminium alloy pivot pin 14 which is maintained in a pair of aligned bearing holes 15,16 one in each lever arm 1,2 by means of a head at one end and riveting on the other end. The pivot pin 6 is greased to allow easy assembly to the transmission line. Mechanical stops 20,21 are provided at either side of the pivotal connection to limit the amount of opening of the spacer.

The spacer assembly is fitted to a power transmission line by means of opening the lever arms 1,2 and closing them to engage two sub-conductors one at either end groove 3,4. The shearhead bolt 11 is then tightened until the head shears off leaving the spacer clamped on the sub-conductors. Fitting is therefore simple and bolt torque need not be measured on assembly.

Furthermore, apart from the thread, the lever arms 1,2 are identical and may be made in the same mould. Virtually no machining is necessary and the lever arms may be used as cast.

Figure 3:
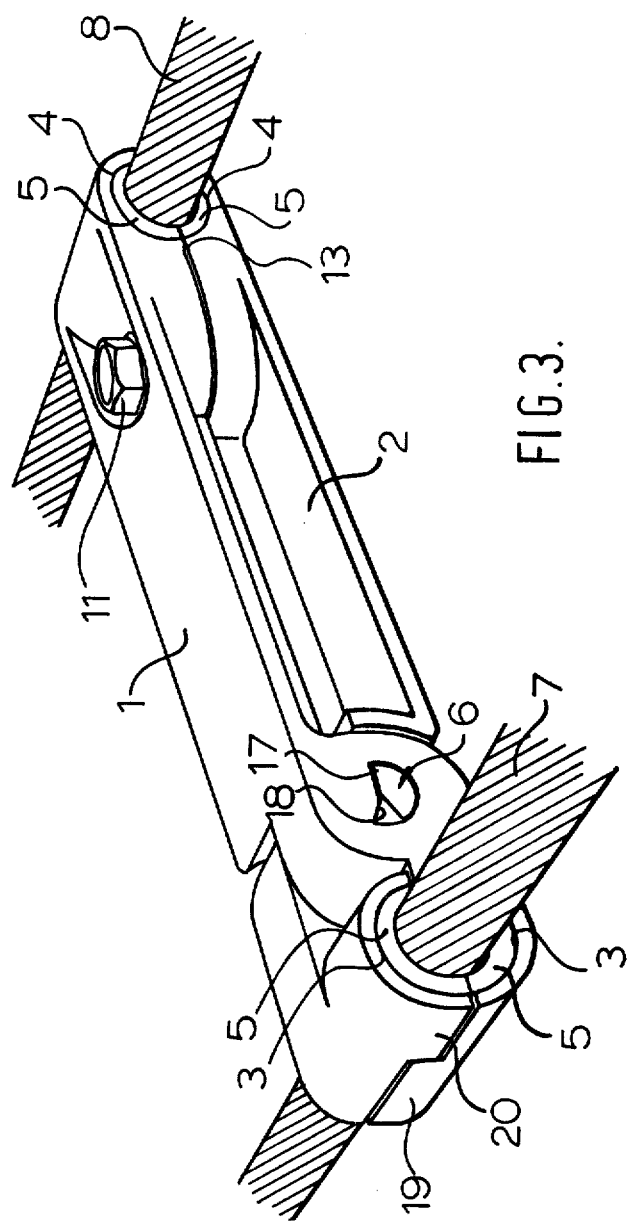
FIG. 3 shows a second embodiment also attached to a pair of sub-conductors.
Figure 4:
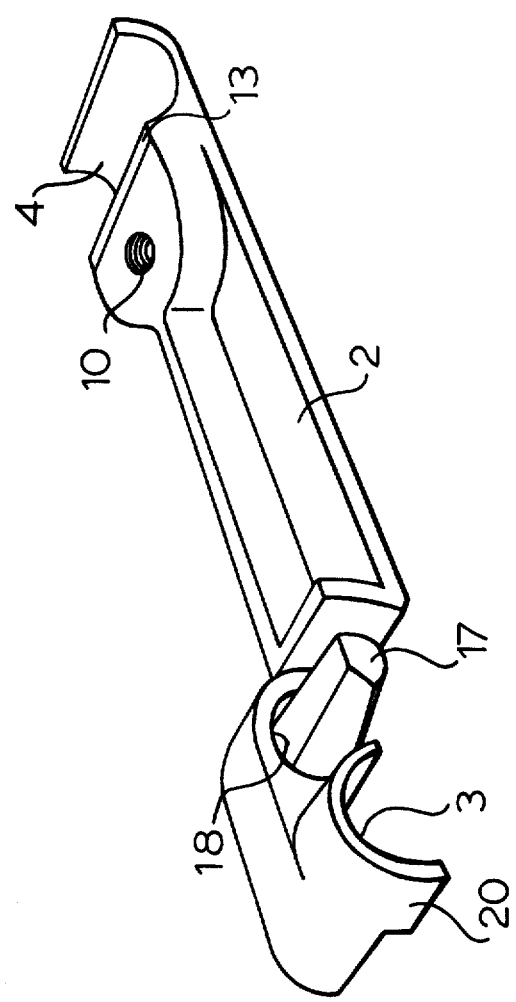

The embodiment shown in FIGS. 3, 4 and 5 uses an alternative pivot arrangement. The components have been given the same reference numerals as the first embodiment and the detail of the pivotal connection 6 is as follows.

The pivotal connection 6 is obtained by the interengagement of a projection 17 cast integrally with the lever arm on one lever arm and a hole 18 in the other lever arm. The projections 17 each have a cross-section which is a minor segment of a circle and the holes are the remainder of the same circle (i.e. a major segment). Interengagement of one lever with the other then provides a pivotal connection. After assembly, the end of one projection is spread out so as to prevent the lever arms becoming disconnected.

The outer parts of the grooves 3 are cut away to form steps 19 and 20 which interlock upon assembly to further lock the lever arms together and prevent the pivot becoming detached.

Alternative fastening means such as clips or collars may be used and some of these obviate the thread machining operation.

Having now described our invention what we claim is:

1. A cable spacer for use between pairs of sub-conductors in overhead power transmission lines comprising a pair of similar lever arms, each lever arm having two semi-circular section grooves with a resilient lining, one groove being provided at either end of the lever arm, a pivotal connection between the lever arms, said pivotal connection being located between the semi-circular section grooves on each arm and adjacent one of the grooves, the axis of the pivotal connection being parallel to the groove axis and arranged such that relative pivotal movement of the lever arms causes the grooves at the ends adjacent to the pivot to come together and form a first circular aperture for engaging a first sub-conductor and the grooves at the other end to form a second circular aperture for a second sub-conductor, a fixing means extending between the arms for locking the arms in engagement with each other, and mechanical stops adjacent to the conductor grooves at the ends of the lever arms remote from the pivotal connection so that in the closed position the relative positions of the lever arms are independent of the fixing means tension.

2. A cable spacer according to claim 1 wherein the pivotal connection comprises a hinge pin which holds the two lever arms together and permits the required relative movement.

3. A cable spacer according to claim 1 wherein the pivotal connection comprises a fixed projection provided on each lever arm having a cross-section which is a minor segment of a circle and an aperture adjacent to the projection which is a major segment of the same circle wherein the projection on one arm engages the aperture on the other arm and vice versa.

4. A cable spacer according to claim 1 wherein the fixing means is at the ends of the lever arms remote from the pivotal connection.

5. A cable spacer according to claim 4 wherein the fixing means comprises a bolt through one lever arm and a screw-threaded aperture in the other lever arm engaging said bolt.

6. A cable spacer according to claim 5 wherein the bolt is a shearhead bolt such that a predetermined tightening torque can be achieved on assembly.

* * * * *